(12) United States Patent
Wang et al.

(10) Patent No.: US 11,399,380 B1
(45) Date of Patent: Jul. 26, 2022

(54) ADAPTIVE INTERFERENCE CANCELLATION IN A WIRELESS COMMUNICATION SYSTEM

(71) Applicant: Sprint Spectrum L.P., Overland Park, KS (US)

(72) Inventors: Yu Wang, Fairfax, VA (US); Sreekar Marupaduga, Overland Park, KS (US); Udit Thakore, Fairfax, VA (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 19 days.

(21) Appl. No.: 16/947,902

(22) Filed: Aug. 24, 2020

(51) Int. Cl.
*H04W 52/24* (2009.01)
*H04W 72/12* (2009.01)

(52) U.S. Cl.
CPC ... *H04W 72/1231* (2013.01); *H04W 72/1273* (2013.01)

(58) Field of Classification Search
CPC ............... H04W 72/082; H04W 28/08; H04W 36/0061; H04W 72/1226
See application file for complete search history.

(56) References Cited

U.S. PATENT DOCUMENTS

| | | | |
|---|---|---|---|
| 2015/0195057 A1* | 7/2015 | Tan | H04J 11/0086 370/252 |
| 2017/0230970 A1* | 8/2017 | Kim | H04W 72/0446 |
| 2018/0323895 A1* | 11/2018 | Hwang | H04W 52/243 |
| 2021/0320807 A1* | 10/2021 | Uy | H04L 63/107 |

* cited by examiner

*Primary Examiner* — Romani Ohri (57) ABSTRACT

An adaptive interference cancellation method is disclosed. In an example, when a UE is served in a first cell by a first access node, the UE detects a second cell provided by a second access node that is not serving the UE. Further, responsive to the detecting, the UE determines that both (i) a broadcast CRS of the second cell occupies air-interface resource elements that the first access node uses as part of a PDSCH of the first cell and (ii) the UE has coverage strength of the second cell that is threshold similar to coverage strength that the UE has from the first access node. And, responsive to the determining, the UE cancels from scheduled PDSCH transmission from the first access node to the UE, potential interference attributable to the broadcast CRS of the detected second cell, such as by reconstructing and subtracting the CRS from the PDSCH transmission.

20 Claims, 7 Drawing Sheets

ADAPTIVE INTERFERENCE CANCELLATION IN A WIRELESS COMMUNICATION SYSTEM

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities. Further, each cell could have a physical cell identity (PCI) or the like that identifies the cell on the carrier, to help distinguish adjacent or otherwise nearby cells that operate on the same carrier as each other. Accordingly, each cell could be characterized by a respective combination of its carrier and its PCI.

On the downlink and uplink, the air interface of each cell could be configured in a specific manner to define physical resources for carrying information (e.g., user-plane data and control-plane signaling) wirelessly between the access node and UEs.

In a non-limiting example implementation, for instance, the air interface of each cell could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information.

In addition, certain groups of these resource elements on the downlink and uplink of the example air interface could then be designated for special use.

For instance, on the downlink, a range of resource elements per subframe could be generally reserved to define a physical downlink control channel (PDCCH) for carrying control signaling such as scheduling directives from the access node to served UEs, and another range of resource elements per subframe could be generally reserved to define a physical downlink shared channel (PDSCH) in which the resource elements could be grouped to define physical resource blocks (PRBs) that could be allocated on an as needed basis to carry data communication from the access node to UEs. Further, within these generally reserved ranges, certain resource elements could be excluded from the PDCCH and PDSCH and reserved for other use, such as to carry signals that UEs could detect as an indication of the presence of coverage and can measure to gauge coverage strength, among other possibilities.

And likewise, on the uplink, certain resource elements could be reserved to define an uplink control channel (PUCCH), and other resource elements between could be generally reserved to define a physical uplink shared channel (PUSCH) in which the resource elements could be grouped to define PRBs that could be allocated on an as needed basis to carry data communications from UEs to the access node. And within these generally reserved ranges, certain resource elements could similarly be excluded from the PUCCH and PUSCH and reserved for other use, such as to carry uplink reference signals and random-access messaging, among other possibilities.

Overview

In example operation, when a UE enters into coverage of such a network, the UE could initially scan for and detect threshold strong coverage of a cell provided by an access node. And the UE could then engage in random-access and connection signaling, such as Radio Resource Control (RRC) signaling, with the access node to establish an air-interface connection (e.g., RRC connection) through which the access node will then serve the UE in the cell.

Further, if the UE is not already registered for service with the core network, the UE could transmit to the access node an attach request, which the access node could forward to a core-network controller for processing. And the core-network controller and access node could then responsively coordinate setup for the UE of one or more user-plane bearers, each including an access-bearer that extends between the access node and a core-network gateway system providing connectivity with a transport network, and a data-radio-bearer (DRB) that extends over the air between the access node and the UE.

Once the UE is so connected and registered, the access node could then serve the UE in a connected mode over the established air-interface connection, coordinating downlink air-interface communication of packet data to the UE and uplink air-interface communication of packet data from the UE.

With the example air interface described above, for instance, when packet data for the UE arrives at the core network from a transport network, the data could flow to the UE's serving access node, and the access node could then allocate one or more downlink PRBs to carry the data to the UE and could transmit to the UE a scheduling directive designating the allocated PRBs, and the access node could then accordingly transmit the data to the UE in the allocated PRBs. Likewise, when the UE has data to transmit on the transport network, the UE could transmit a scheduling request to the access node, the access node could responsively allocate one or more uplink PRBs to carry the data from the UE and could transmit to the UE a scheduling directive designating the allocated PRBs, and the UE could then accordingly transmit the data to the access node in the allocated PRBs.

One technical issue that can arise when a UE is served by an access node in a given cell is that downlink transmissions from one or more other access nodes within the same downlink frequency channel can interfere with the UE's receipt of scheduled PSDCH transmissions from the UE's serving access node. Namely, if another access node provides coverage within the same downlink frequency channel and that coverage extends to the UE's location, then transmissions by the other access node with time and frequency falling within any downlink PRBs allocated to the UE could make it difficult for the UE to successfully receive and process those PRBs.

In some situations, a serving access node may have advanced knowledge of such potentially interfering transmission by another access node, and the serving access node may therefore structure its own PDSCH in a manner that helps minimize or avoid that interference. For instance, given advanced knowledge that transmission from another access node will occupy specific resource elements that would normally fall within the serving access node's PDSCH, the serving access node could intentionally exclude those resource elements from its PDSCH. Thus, when the serving access node transmits on downlink PRBs to UEs, the serving access node could forgo transmission on the excluded resource elements within those PRBs, to avoid having the UEs experience the expected interference on the excluded resource elements.

An example of this situation could arise in a dynamic spectrum sharing (DSS) arrangement in which multiple collocated access nodes provide spatially overlapping coverage on carriers that overlap partially or fully in RF spectrum with each other, and where a cell-specific reference signal (CRS) broadcast by one of the access nodes occupies certain resource elements that would normally fall within another access node's PDSCH.

DSS could apply by way of example at a cell site or in another scenario that supports operation according to two RATs (such as 4G LTE and 5G NR), with one access node providing a cell according to a first RAT (first-RAT service) and another access node providing a spatially overlapping cell according to a second RAT (second-RAT service). Given spectrum-licensing costs, an operator of such access nodes might configure the two access nodes to operate respectively on carriers that overlap partially or fully in frequency with each other, perhaps with the PDSCH of the first-RAT access node's cell partially or fully overlapping with the PDSCH of the second-RAT access node's cell.

To facilitate having the access nodes operate on these overlapping carriers with minimized interference, the access nodes could be configured to coordinate their operation so that they do not allocate the same portions of RF spectrum as each other at the same time as each other. For instance, if the first-RAT access node is going to allocate downlink PRBs in a given subframe for carrying data to one or more served UEs, the first-RAT access node could engage in signaling with the second-RAT access node to ensure that, in the same subframe, the second-RAT access node will not allocate any PRBs that would overlap in frequency with those allocated by the first-RAT access node.

With this arrangement, however, the first-RAT access node might broadcast a CRS that occupies certain resource elements per downlink subframe, at least some of which falling within the second-RAT access node's PDSCH and perhaps specifically within PRBs that the second-RAT access node may allocate. This CRS transmission by the first-RAT access node within any PRBs allocated by the second-RAT access node could interfere with UE reception and processing of those PRBs.

To help avoid this problem in the DSS arrangement, the second-RAT access node could structure its own PDSCH to exclude the resource elements that the first-RAT access node's CRS would occupy. And the second-RAT access node could inform its served UEs of this arrangement by way of broadcast or unicast control signaling to the UEs. Thus, when the second-RAT access node then allocates and transmits to its served UEs on PRBs of the second-RAT access node's cell, the second-RAT access node could avoid transmitting data on the resource elements occupied by the first-RAT access node's CRS, and the recipient UEs may therefore avoid the CRS interference issue on those resource elements.

Unfortunately, however, a representative network may also include one or more other nearby first-RAT access nodes that also provide coverage overlapping spatially and in frequency with that of the second-RAT access node and that broadcast respective CRSs occupying still other resource elements of the second-RAT access node's PDSCH. As a result, even though the second-RAT access node may exclude from its PDSCH the resource elements on which the collocated first-RAT access node broadcasts a CRS, the CRS transmissions from the one or more other nearby first-RAT access nodes may still present PDSCH interference issues for UEs served by the second-RAT access node.

Further, unlike the situation with the CRS of the co-located first-RAT access node that is likely to interfere with PDSCH reception by the second-RAT access node's served UEs, the second-RAT access node may not know whether or when the CRS from each other nearby first-RAT access node would pose an interference issue for UEs served by the second-RAT access node. And for this or other reasons, the second-RAT access node may not similarly exclude from its PDSCH the resource elements occupied by the CRS of each such other nearby first-RAT access node. Yet there may be situations where the second-RAT access node's served UEs would in fact experience such interference.

In addition, a similar problem could exist for a UE served by a first-RAT access node, if one or more other nearby access nodes provide coverage that overlaps spatially and in frequency with the serving first-RAT access node's cell and each broadcast a respective CRS that occupies different respective resource elements of the serving first-RAT access node's PDSCH. In this situation, the serving first-RAT access node would by definition exclude from its own PDSCH the resource elements occupied by its own CRS. But the serving first-RAT access node may not exclude from its PDSCH the resource elements occupied by the CRS respectively of each nearby access node. Consequently, the first-RAT access node's served UEs may similarly experience interference from the CRS respectively of one or more such nearby access nodes.

The present disclosure provides a mechanism to help address this technical issue.

In accordance with the disclosure, when a UE is served by an access node providing the UE with a particular level of coverage strength, the UE will detect that another access node (not serving the UE) provides comparable signal strength at the UE's location and broadcasts a CRS that occupies resource elements of the serving access node's PDSCH. And in response, the UE will itself generate a copy of the CRS signal that other access node is broadcasting and will subtract that generated CRS signal from scheduled PDSCH transmission that the UE receives from the serving access node, to help cancel out the interference from the other access node's CRS. Further, the UE could carry out this process respectively for each of multiple such detected other cells.

In example implementation, as a condition precedent for the UE generating and subtracting from received PDSCH transmission a copy of the CRS signal that the nearby cell broadcasts, the UE could require (i) that the UE's coverage strength from the other access node is threshold similar to the UE's coverage strength from the UE's serving access node and (ii) that the CRS of the other access node occupies resource elements that the UE's serving access node does not already exclude from the serving access node's PDSCH.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system supporting both 4G LTE and 5G NR, where 4G LTE is the first RAT noted above and 5G NR is the second RAT noted above. But it should be understood that the disclosed principles could extend to apply in other scenarios as well, such as with a single-RAT system, with other RATs, and with other network configurations, among other possibilities.

Further, it should be understood that other changes from the specific arrangements and processes described are possible. For instance, various described entities, connections, operations, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

Figure 1:
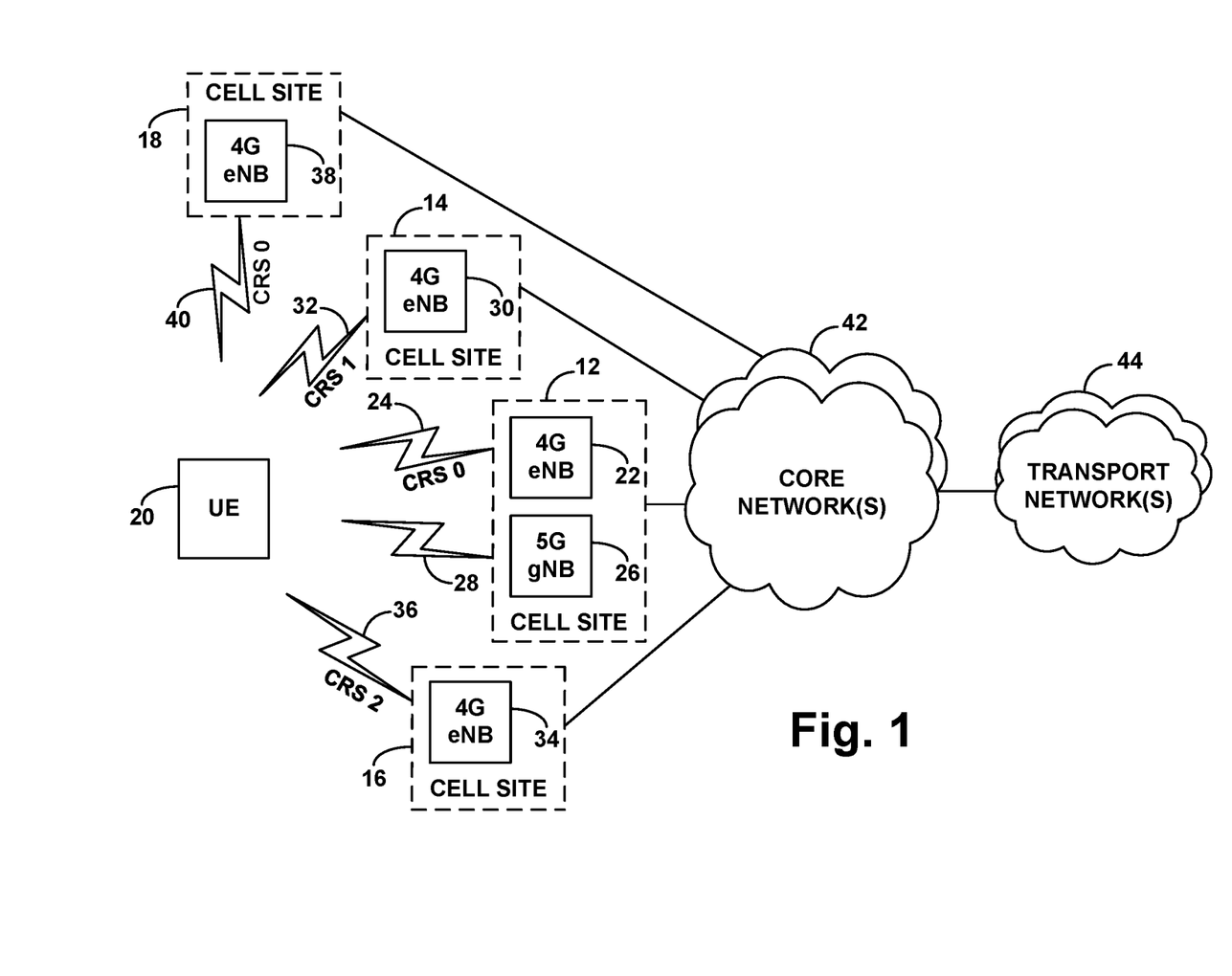
FIG. 1 is a simplified block diagram of an example network arrangement in which aspects of the present disclosure can be implemented.

FIG. 1 is a simplified block diagram of an example network arrangement including several example cell sites 12, 14, 16, 18, each having one or more access nodes each configured to provide a respective cell that extend to the current location of an example UE 20. Cell site 12 is shown including both a 4G LTE access node (a 4G evolved Node-B (eNB)) 22 that provides a 4G cell 24 and a collocated 5G NR access node (a 5G next generation Node-B (gNB)) 26 that provides a 5G cell 28, with both cells extending to the location of the UE 20. Nearby cell site 14 is then shown including a 4G eNBs 30 that provides a 4G cell 32, nearby cell site 16 is shown including a 4G eNB 34 providing a 4G cell 36, and nearby cell site 18 is shown including a 4G eNB 38 providing a 4G cell 40, with all of these cells likewise extending to the location of the UE 20.

In addition, FIG. 1 illustrates each cell site being connected with at least one core network 42, and the core network(s) providing connectivity with at least one transport network 44. In representative implementations, for instance, each cell site might include a cell site router that provides connectivity between a baseband unit (BBU) respectively of each access node and an upstream router of a core network.

An example core network could include a user-plane subsystem (not shown), such as a Serving Gateway (SGW) and Packet Data Network Gateway (PGW), or a User Plane Function (UPF), that provide connectivity with a transport network such as the Internet. Further, the example core network could include a control-plane subsystem (not shown), such as a Mobility Management Entity (MME), or Access and Mobility Management Function (AMF) and Session Management Function (SMF), which could be responsible for managing bearer setup and other operations.

Each of the access nodes shown in FIG. 1 could be a macro access node of the type configured to provide a wide range of coverage or could take other forms, such as a small cell access node, a repeater, a femtocell access node, or the like, possibly configured to provide a smaller range of coverage. Further, the access nodes could have respective antenna structures and other cell site equipment designed to provide their respective coverage and service in accordance with their applicable RAT. At cell site 12, the 4G eNB 22 and 5G gNB 16 may also share antenna structure and/or other cell site equipment to facilitate providing their respective cells.

As discussed above, each access node's cell could be defined on a respective carrier, which could be FDD or TDD. Further, for present purposes, we can assume that all of the illustrated cells operate on common RF spectrum such as on the same carrier as each other or on carriers whose frequency ranges overlap at least partially with each other. For example, all of the cells could be defined on a common 20 MHz wide TDD carrier in one of the bands noted above and thus on the same frequency as each other. Other examples could be possible as well.

In an example implementation, the air interface of each access node's cell could be configured as noted above to define various air-interface resources for carrying communications between the access node and UEs.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the carrier bandwidth could be divided into subcarriers with specified subcarrier spacing on the order of 15 to 240 kHz. With this example arrangement, the air interface of each cell would define the array of resource elements as noted above, with each resource element each spanning a respective symbol time segment and occupying a respective subcarrier, and the access node and UEs could communicate with each other through modulation of the subcarriers to carry data in those resource elements. Further, as noted above, particular sets of resource elements on the air interface could be reserved for specific purposes.

Figure 2:
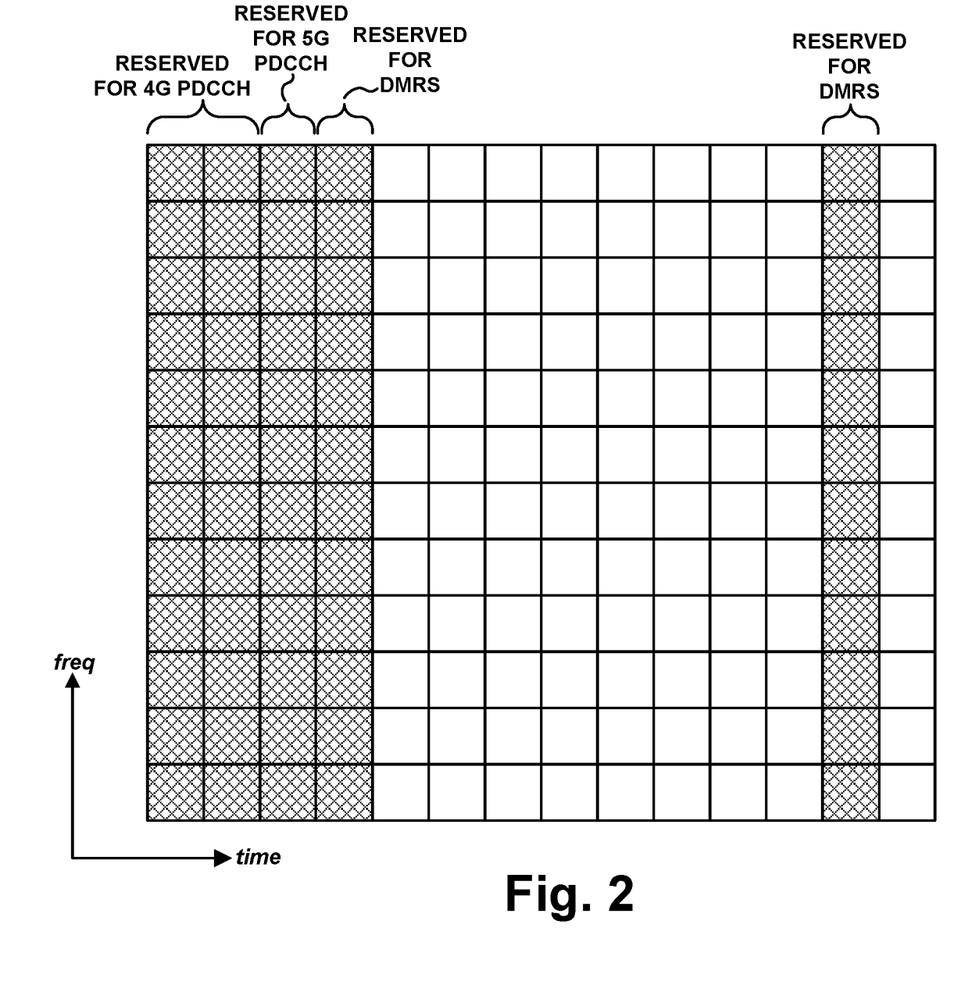
FIG. 2 is a simplified resource grid representing a portion an air-interface structure of cells in the arrangement of FIG. 1.

FIG. 2 is a simplified resource grid representing a portion of this example air-interface structure. As shown in FIG. 2, the example portion spans 180 kHz of frequency, divided into 12 subcarriers spaced apart from each other by 15 kHz increments, and spans a 1-millisecond duration of a downlink subframe, divided into 14 example symbol time segments each 66.7 microseconds long (allowing for a cyclic prefix or other guard time between symbols). Each of the cells may include this same array of resource elements. Alternatively, one or more of the cells may include differently configured resource elements, perhaps with different subcarrier spacing and/or symbol length, among other possible variations.

As cell site 12 provides both 4G and 5G service on the same carrier frequency, the 4G eNB 22 and 5G gNB 26 could be configured to operate with DSS as described above to share use of that frequency. Further, the 4G LTE and 5G NR protocols may provide for different respective uses of the resource elements in the example grid. For these or other reasons, the 4G eNB 22 and 5G gNB 26 could therefore be arranged to make different respective uses of the resource elements in the example grid. And each access node could inform its served UEs of the arrangement through broadcast or unicast control signaling.

As to the 5G NR cell 28, for instance, the 5G gNB 26 could exclude the first two symbol time segments of the example grid from use, to the 4G eNB 22 to use those symbol time segments as part of a 4G PDCCH of 4G cell 24. Further, the 5G gNB 26 could reserve the third symbol time segment of the example grid as a 5G PDCCH and perhaps for use to carry a 5G synchronization signal that UEs could measure to determine 5G coverage strength. And the 5G gNB 26 could further reserve two other symbol time segments for use to carry downlink modulation reference signals (DMRSs) that UE's could evaluate to facilitate downlink beamforming and the like. The remaining nine symbol time segments of the example resource grid could thus be left to generally define the 5G PDSCH of 5G cell 28.

However, certain resource elements distributed throughout at least those remaining symbol time segments of the example grid might be used to carry broadcast CRS transmissions respectively from each of the illustrated 4G eNBs 22, 30, 34, 38.

Figure 3:
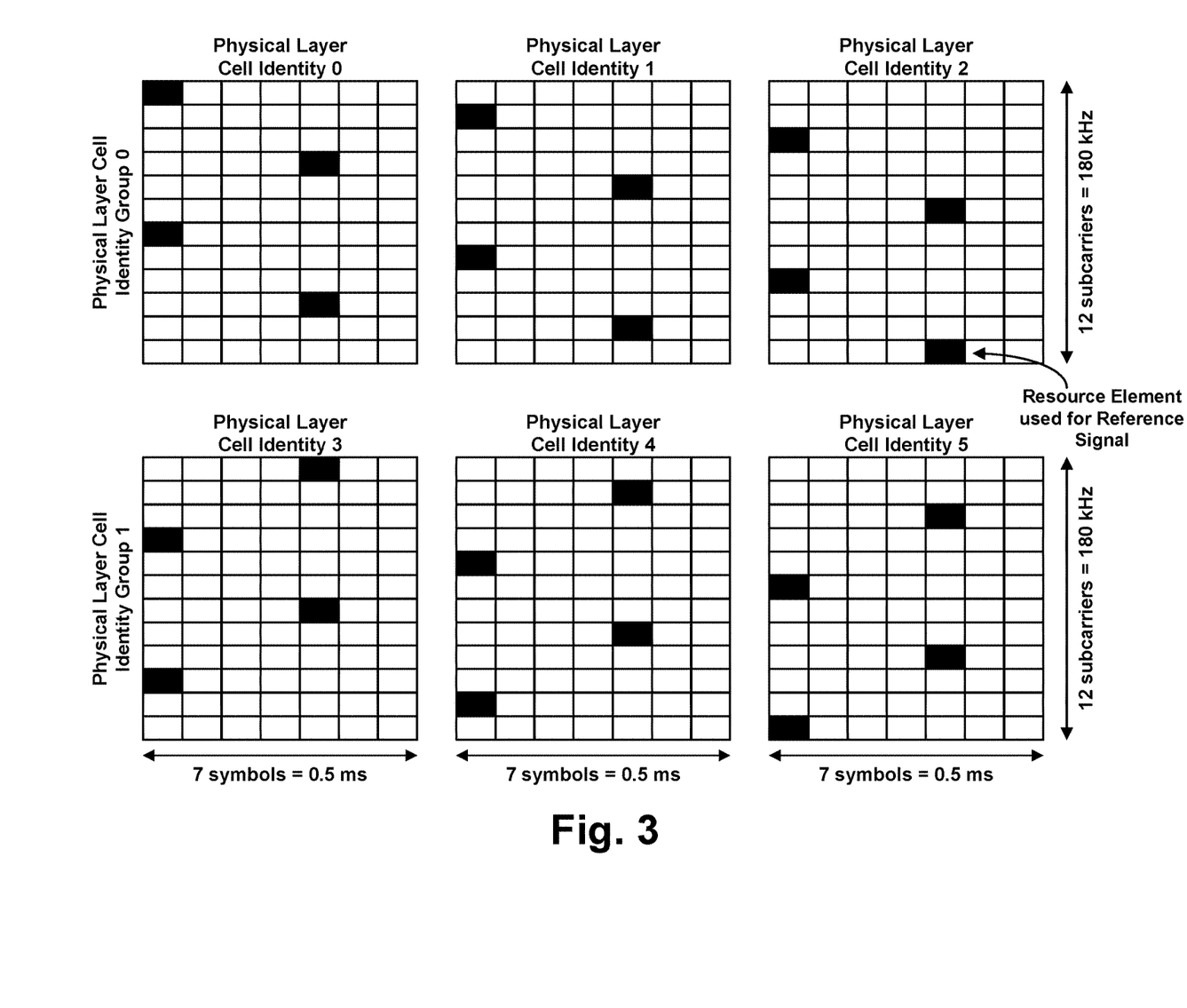
FIG. 3 is an illustration of various possible CRS resource-element distributions in an accordance with an implementation of LTE.

Namely, in accordance with an implementation of the 4G LTE protocol, the downlink air interface of each 4G cell will provide a CRS in a specific pattern of resource elements, with a frequency position of that CRS pattern in the resource grid being based on the PCI of the cell. In particular, referring to FIG. 3, the CRS pattern per cell would occupy one of six possible frequency positions, shifted from a base frequency position by a number of subcarriers equal to modulo(6) of the cell's PCI. Thus, LTE would six different CRS resource-element distributions, which could be referred to as CRS 0, CRS 1, CRS 2, CRS 3, CRS 4, and CRS 5.

In practice, each 4G eNB could broadcast in its cell a synchronization signal (not shown) indicating the PCI of the 4G eNB's cell. When a UE detects a 4G cell's synchronization signal, the UE could thus determine the cell's PCI from synchronization signal and, by computing a modulo(6) of the PCI, could determine the resource elements that carry the cell's CRS. The UE could then determine a reference signal receive power (RSRP) of the cell by evaluating the energy level that the UE receives in the determined CRS resource elements.

Figure 4:
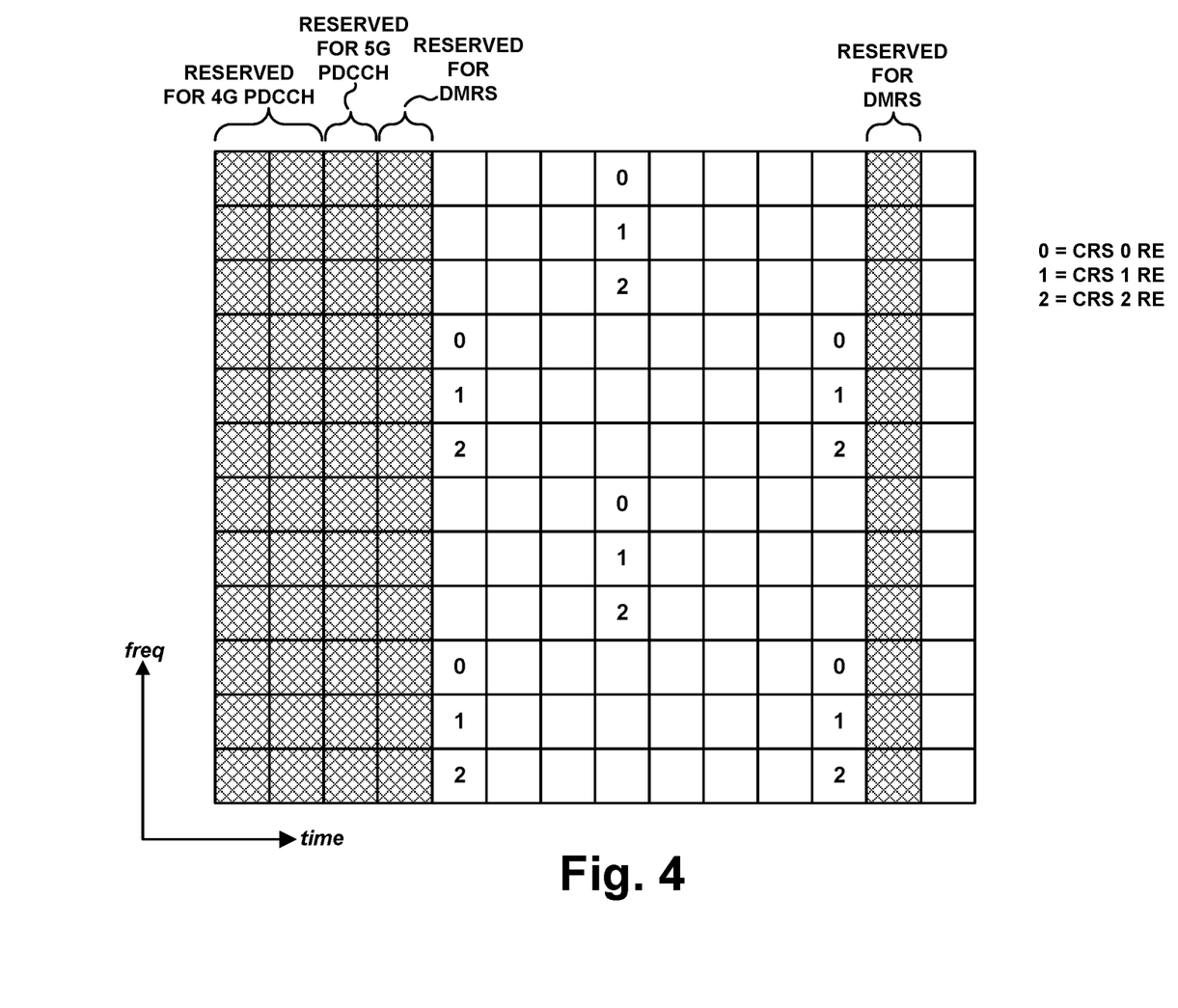
FIG. 4 is a variation of the resource grid of FIG. 2, showing presence of three example CRS resource-element distributions.

FIG. 4 next illustrates the impact on the example resource grid of FIG. 2 at the location of UE 20, taking into consideration the CRS resource-element distributions of the various 4G cells. Namely, this figure shows that, within the range of resource elements generally reserved as the 5G PDSCH of 5G cell 28, numerous resource elements are occupied by the broadcast CRS transmissions respectively of the various 4G cells.

As shown, one set of resource elements in the example grid is occupied by the CRS-0 transmission of the 4G cell 24, another set of resource elements is occupied by the CRS-1 transmission of the 4G cell 30, and yet another set of resource elements is occupied by the CRS-2 transmission of the 4G cell 34. Further, because the 4G cell 40 also uses CRS 0, its CRS transmission would occupy the same resource elements as the CRS of the 4G cell 24. (Practically speaking, a service provider would attempt to avoid such a CRS conflict, but it may occur as a result of long-distance coverage or for other reasons.)

At cell site 12, given the DSS relationship between the 4G cell 24 and the 5G cell 28, and knowing that the 4G eNB 22 and 5G gNB 26 provide coverage of generally the same direction and scope as each other, the 5G gNB 26 could be configured to exclude from the 5G PDSCH of the 5G cell 28 the resource elements that are occupied by the CRS-0 transmission of 4G cell 24. However, the 5G gNB 26 may not know whether or when its 5G served UEs are also within coverage of 4G eNB 30 or 4G eNB 34. And for this or other reasons, the 5G gNB 26 may not similarly exclude from the 5G PDSCH of the 5G cell 28 the resource elements that are occupied by the CRS-1 and CRS-2 transmissions of 4G cells 32, 36.

When example UE 20 enters into coverage of the system illustrated by FIG. 1, the UE may scan for 5G coverage and may detect threshold strong coverage of the 5G cell 28 provided by 5G gNB 26. In line with the discussion above, the UE may then engage in random access signaling and RRC signaling with the 5G gNB 26 to establish an air-interface connection through which the 5G gNB 26 would then serve the UE in the 5G cell 28.

To help facilitate serving the UE in the 5G cell 28 given the DSS arrangement noted above, the 5G gNB 26 may provide the UE with information related to the co-existence of the 4G cell 24 and/or of the DSS arrangement. For instance, the 5G gNB 26 may inform the UE of the symbol time segment that will be used for the PDCCH of the 5G cell 28, and the 5G gNB 26 may inform the UE directly or indirectly of what resource elements the 5G gNB 26 excludes from its PDSCH due to the CRS-0 resource-element distribution of the 4G cell 24. By way of example, the 5G gNB 26 may inform the UE of the PCI of the co-existing 4G cell 24, and, by a modulo(6) operation, the UE could thereby determine the CRS-0 resource elements that will be excluded from the 5G PDSCH of the 5G cell 28.

In accordance with the present disclosure, as noted above, the UE could then also engage in a process to adaptively eliminate potential interference from CRS transmission on other resource elements of the 5G cell 28. Namely, in the non-limiting example above, the UE could work to eliminate potential interference from CRS transmission of each other 4G cell from which the UE receives comparable coverage strength and that occupies resource elements that the 5G gNB 26 does not already exclude from the 5G PDSCH of the 5G cell 28.

To facilitate this in practice, in response to being informed or otherwise learning that the 5G gNB 26 already excludes the CRS-0 resource-element distribution from the 5G PDSCH, the UE could specifically search for each of one or more other cells based on their providing a CRS resource-element distribution other than CRS-0. To do this, the UE could scan for synchronization-signal broadcasts each indicating a respective PCI the modulo(6) of which is other than 0 (zero).

Thus, in the arrangement of FIG. 1, the UE may deem 4G cells 32 and 36 to be candidate interferers, because they use CRS 1 and 2 respectively rather than CRS 0. But the UE may decide that 4G cell 40 is not a candidate interferer, since 4G cell 40 uses CRS 0 and since the UE's serving 5G gNB 26 already excludes from the 5G PDCCH of 5G cell 28 the resource elements of CRS 0.

Upon identifying 4G cells 32 and 36 as candidate interferers, the UE could further determine for each identified candidate interferer whether the UE has coverage strength of the candidate interferer that could make the candidate interferer's CRS a likely interference problem for the UE receiving PDSCH transmission from the 5G gNB 26.

To make this determination for each candidate interferer, as noted above, the UE could compare RSRP from the UE's serving cell site with RSRP from the candidate interferer to determine whether the RSRPs are threshold similar. For instance, the UE could determine RSRP from the candidate interferer by evaluating the CRS of the candidate interferer using known techniques. Further, the UE could determine RSRP from the UE's serving cell site, such as RSRP from the UE's serving 5G gNB 26 or perhaps RSRP from the co-existing 4G eNB 22, also using known techniques. And the UE could compute a difference between the UE's RSRP from the candidate interferer and the UE's RSRP from the UE's serving cell site and determine whether the difference is at least as low as a predefined threshold deemed to be potentially problematic.

For each such 4G cell whose CRS the UE determines to fall within the 5G PDSCH of the UE's serving 5G cell 28 (i.e., not excluded by the 5G eNB 26) and to provide the UE with coverage strength threshold similar to the UE's serving coverage strength, the UE could then take action as noted above to help cancel out the associated potential interference to the UE's receipt of scheduled PDSCH transmission from the 5G gNB 26.

In particular, as noted above, in response to identifying each such potential interference, the UE could internally generate (construct) a copy of the CRS that the 4G cell would provide and could subtract that generated CRS from scheduled PDSCH transmission that the UE receives from 5G gNB 26. Here, for instance, the UE could generate the CRS using one or more known CRS-generating techniques (e.g., known to facilitate coherent signal detection). And the UE could subtract one signal from another using one or more known signal processing techniques.

The result of this process could thereby be the reduction or elimination of the potential CRS interference from the UE's receipt of scheduled PDSCH transmission from the 5G gNB 26.

In an example implementation, the UE could be configured to carry out this interference cancellation for up to a predefined maximum number, N, of identified interfering cells. The predefined maximum number N could be set by engineering design to a value such as 5 for instance.

If the UE identifies more than N candidate interferers, the UE might then rank the candidate interferers in order of how close their RSRP is to RSRP of the UE's serving cell site and could select the closes N candidate interferers to be subject to interference cancellation.

Further, the UE could work to distribute application of this process to various CRS resource-element distributions. For instance, if the UE identifies multiple candidate interferers with the same CRS resource-element distribution as each other and other candidate interferers with different CRS resource-element distribution patterns, the UE could work to apply the process as evenly to as many different CRS resource-element distributions as possible.

As an example of this, assume that N is 5 and that the UE detects 7 candidate interferers with CRS 1, 6 candidate interferers with CRS 2, and 2 candidate interferers with CRS 3. In this situation, an example relatively even distribution of the process could be to apply the process with respect to 2 of the CRS-1 candidate interferers, 2 of the CRS-2 candidate interferers, and 1 of the CRS-3 candidate interferers. Other examples are possible as well.

Further, as noted above, the present process could also apply by way of example with respect to a single RAT, such as 4G LTE only.

For instance, consider an example where a UE connects with and is served by 4G eNB 22 in 4G cell 24. In that scenario, the 4G eNB 22 would use CRS 0 as noted above, and so the 4G eNB 22 would exclude from its 4G PDSCH the resource elements of the CRS-0 resource-element distribution. In this case, the UE might also detect coverage of the other 4G cells 32, 36, 40 and could carry out the processing as noted above.

Namely, the UE could first identify as candidate interferers just 4G cells 32 and 36, eliminating 4G cell 38 on grounds that the CRS-0 resource-element distribution of 4G cell 38 is already excluded from the 4G PDSCH of the UE's serving 4G cell 24. And for each identified candidate interferer, the UE could determine if the UE's coverage strength from the candidate interferer is close enough to the UE's coverage strength from the UE's serving cell site (i.e., from the UE's serving 4G eNB 22). For each of one or more such candidate interferers that the UE thereby deems to be a potential interference problem, the UE could then generate and subtract a copy of the candidate interferer's CRS from 4G PDSCH transmission that the UE receives from its serving 4G eNB 22.

Figure 5:
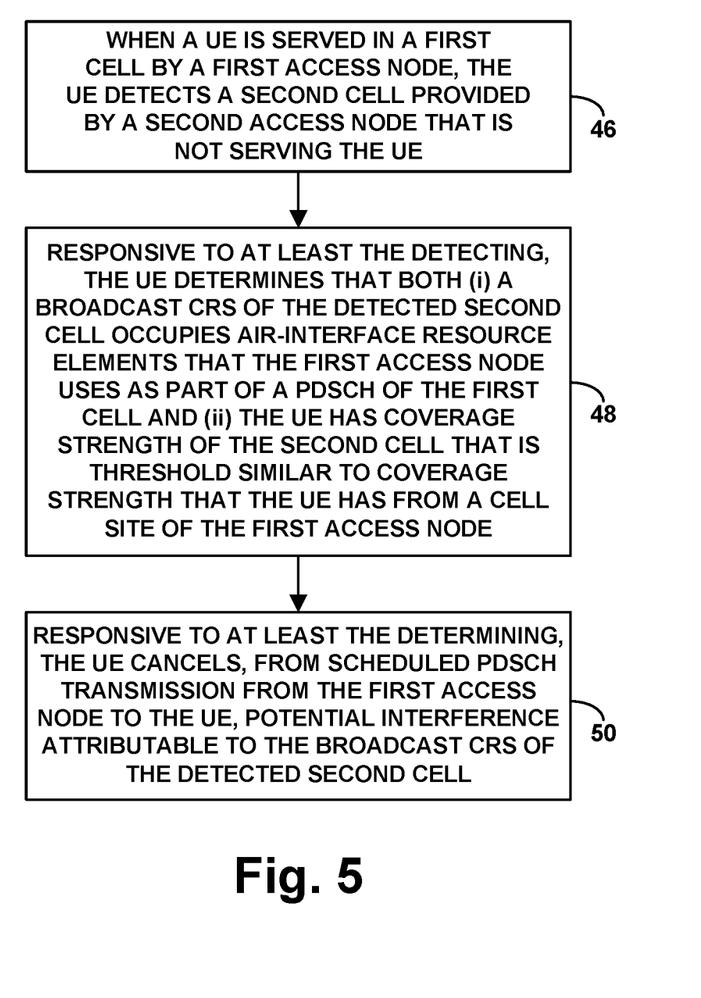
FIG. 5 is a flow chart depicting an example method in accordance with the disclosure.

FIG. 5 is next a flow chart depicting a method that could be carried out in accordance with the present disclosure, to help adaptively cancel interference in a wireless communication system including multiple access nodes. In an example implementation, this method could be carried out by a UE such as that noted above, among other possibilities.

As shown in FIG. 5, at block 46, the example method includes, when the UE is served in a first cell by a first one of the access nodes, the UE detecting a second cell provided by a second one of the access nodes that is not serving the UE. Further, at block 48, the method includes, responsive to at least the detecting, the UE determining that both (i) a broadcast CRS of the detected second cell occupies air-interface resource elements that the first access node uses as part of a PDSCH of the first cell and (ii) the UE has coverage strength of the second cell that is threshold similar to coverage strength that the UE has from a cell site of the first access node. And at block 50, the method includes, responsive to at least the determining, the UE cancelling, from scheduled PDSCH transmission from the first access node to the UE, potential interference attributable to the broadcast CRS of the detected second cell.

In line with the discussion above, in this method, the act of the UE detecting the second cell could involve the UE detecting a broadcast synchronization signal of the second cell.

Further, as discussed above, the act of the UE determining that the broadcast CRS of the detected second cell occupies air-interface resource elements that the first access node uses as part of the PDSCH of the first cell could involve (i) the UE determining a PCI of the detected second cell, (ii) the UE mapping the determined PCI of the detected second cell to a respective resource-element distribution, and (iii) the UE determining that the resource-element distribution is part of the PDSCH of the first cell.

Still further, as discussed above, the act of determining that the resource-element distribution is part of the PDSCH of the first cell could involve determining that the second access node does not exclude the resource-element distribution from the PDSCH of the first cell. Further, the act of determining that the resource-element distribution is part of the PDSCH of the first cell could involve determining that the resource-element distribution differs from a CRS resource-element distribution of a third cell provided by third access node collocated with the second access node or perhaps determining that the resource-element distribution differs from a CRS resource-element distribution of the first cell.

In addition, as discussed above, the act of determining that the UE has coverage strength of the second cell that is threshold similar to coverage strength that the UE has from a cell site of the first access node could involve (i) the UE determining a first RSRP of the cell site of the first access node, (ii) the UE determining a second RSRP of the second cell, (iii) the UE computing a difference between the first RSRP and the second RSRP, and (iv) the UE determining that the computed difference is lower than a predefined threshold.

Yet further, as discussed above, the act of cancelling, from scheduled PDSCH transmission from the first access node to the UE, potential interference attributable to the broadcast CRS of the detected second cell could involve (i) the UE generating a copy of the CRS of the second cell and (ii) the UE subtracting the generated copy of the CRS of the second cell from scheduled PDSCH transmission that the UE receives from the first access node.

Still further, in an example implementation as discussed above, the first access node and first cell may operate according to a first RAT, and the second access node and second cell may operate according to a second RAT different than the first RAT. For instance, the first RAT may be 5G NR, and the second RAT may be 4G LTE, among other possibilities.

Figure 6:
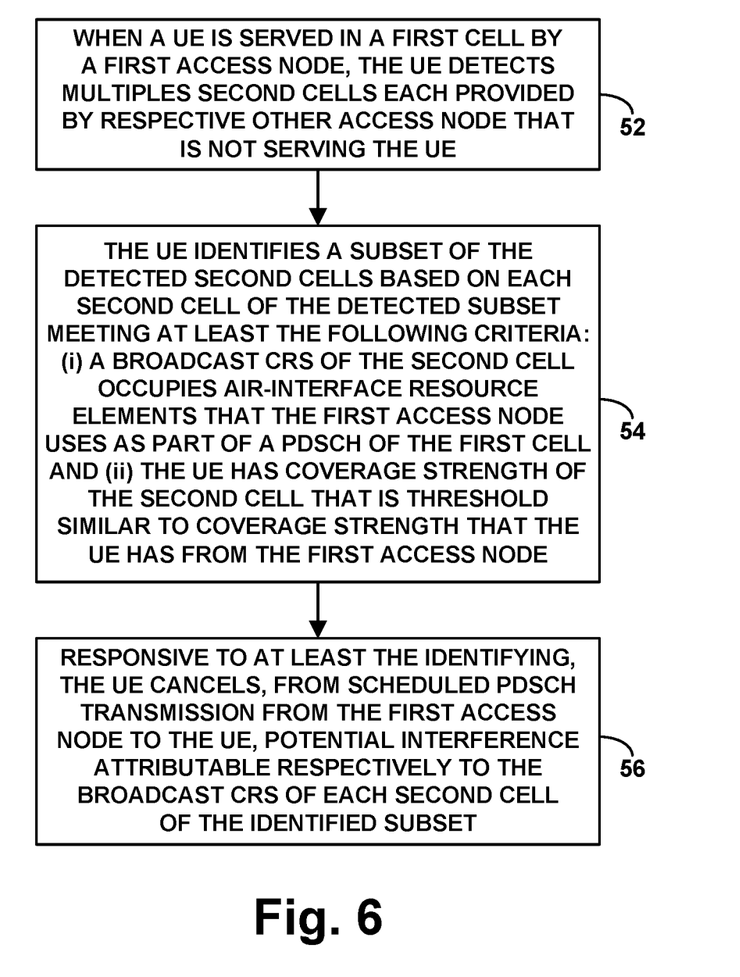
FIG. 6 is another flow chart depicting an example method in accordance with the disclosure.

FIG. 6 is next another flow chart depicting a method that could be carried out in accordance with the present disclosure adaptively cancel potential interference in a wireless communication system that includes multiple access nodes each configured to provide a respective cell.

As shown in FIG. 6, at block 52, the method includes, when a UE is served in a first cell by a first one of the access nodes, the UE detecting multiples second cells each provided by another respective access node of the plurality that is not serving the UE. Further, at block 54, the method includes the UE identifying a subset of the detected second cells based on each second cell of the detected subset meeting at least the following criteria: (i) a broadcast CRS of the second cell occupies air-interface resource elements that the first access node uses as part of a PDSCH of the first cell and (ii) the UE has coverage strength of the second cell that is threshold similar to coverage strength that the UE has from the first access node. And at block 56, the method includes, responsive to at least the identifying, the UE cancelling, from scheduled PDSCH transmission from the first access node to the UE, potential interference attributable respectively to the broadcast CRS of each second cell of the identified subset.

In line with the discussion above, for instance, this method could additionally include the UE limiting the subset of the detected second cells to be no more than a predefined maximum number of the second cells. And the method could additionally include the UE distributing the cancelling of potential interference among multiple CRS resource-element distributions.

Various other features described herein can be implemented in this context as well, and vice versa. For instance, the first cell could operate according to a first RAT, and each second cell could operate according to a second RAT different than the first RAT, among other possibilities.

Figure 7:
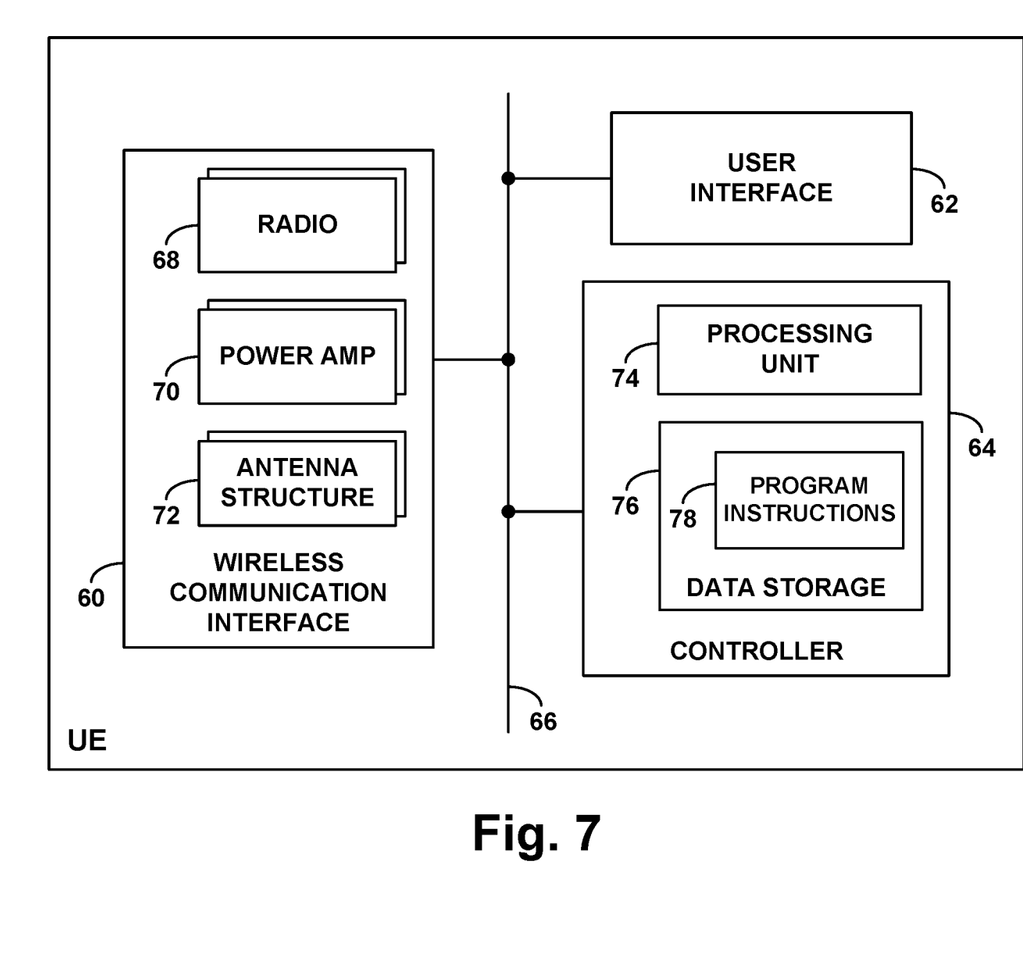
FIG. 7 is a simplified block diagram of an example UE operable in accordance with the disclosure.

FIG. 7 is next a simplified block diagram of a UE that could be configured to carry out various features described herein. As shown in FIG. 7, the example UE includes a wireless communication interface 60, a user interface 62, and a controller 64. These components could be interconnected, integrated, and/or communicatively linked together in various ways now known or later developed, such as by a system bus or other connection mechanism 66 for instance.

The wireless communication interface 60 could operate to support and thus facilitate air interface communication according to one or more RATs, such as 4G LTE and 5G NR for instance. As shown, for instance, the wireless communication interface could include one or more radios 68, one or more power amplifiers 70, and one or more antenna structures 72.

The user interface 62, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

And the controller 64, which could be integrated with wireless communication interface 60 (e.g., on a common chipset) or provided in another manner, could operate to carry out or cause the UE to carry out various operations described herein. As shown, controller 64 could include at least one processing unit 74 (e.g., one or more general purpose processors such as microprocessors and/or one or more special purpose processors such as application specific integrated circuits), and non-transitory data storage 76 (e.g., one or more volatile and/or non-volatile storage components, such as magnetic, optical and/or flash storage). And non-transitory data storage 76 could hold program instructions 78, which could be executable by the processing unit 66 to carry out the various described operations. Alternatively, the controller could take other forms.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

We claim:

1. A method for adaptively cancelling potential interference in a wireless communication system, the wireless communication system including a plurality of access nodes each configured to provide a respective cell, the method comprising:
    detecting, by a UE that is served in a first cell by a first access node of the plurality, a second cell provided by a second access node of the plurality that is not serving the UE;
    responsive to at least the detecting, determining by the UE that both (i) a broadcast cell-specific reference signal (CRS) of the detected second cell occupies air-interface resource elements that the first access node uses as part of a physical downlink shared channel (PDSCH) of the first cell and (ii) the UE has coverage strength of the second cell that is threshold similar to coverage strength that the UE has from a cell site of the first access node; and
    responsive to at least the determining, cancelling by the UE, from scheduled PDSCH transmission from the first access node to the UE, potential interference attributable to the broadcast CRS of the detected second cell.

2. The method of claim 1, wherein detecting the second cell comprises detecting by the UE a broadcast synchronization signal of the second cell.

3. The method of claim 1, wherein determining that the broadcast CRS of the detected second cell occupies air-interface resource elements that the first access node uses as part of the PDSCH of the first cell comprises:
    determining by the UE a physical cell identity (PCI) of the detected second cell;
    mapping by the UE the determined PCI of the detected second cell to a respective resource-element distribution; and
    determining by the UE that the resource-element distribution is part of the PDSCH of the first cell.

4. The method of claim 3, wherein determining that the resource-element distribution is part of the PDSCH of the first cell comprises determining that the second access node does not exclude the resource-element distribution from the PDSCH of the first cell.

5. The method of claim 3, wherein determining that the resource-element distribution is part of the PDSCH of the first cell comprises determining that the resource-element distribution differs from a CRS resource-element distribution of a third cell provided by third access node collocated with the second access node.

6. The method of claim 3, wherein determining that the resource-element distribution is part of the PDSCH of the first cell comprises determining that the resource-element distribution differs from a CRS resource-element distribution of the first cell.

7. The method of claim 1, wherein determining that the UE has coverage strength of the second cell that is threshold similar to coverage strength that the UE has from a cell site of the first access node comprises:
    determining by the UE a first reference signal receive power (RSRP) of the cell site of the first access node;
    determining by the UE a second RSRP of the second cell;
    computing by the UE a difference between the first RSRP and the second RSRP; and
    determining by the UE that the computed difference is lower than a predefined threshold.

8. The method of claim 1, wherein cancelling, from scheduled PDSCH transmission from the first access node to the UE, potential interference attributable to the broadcast CRS of the detected second cell comprises:
    generating by the UE a copy of the CRS of the second cell; and
    subtracting the generated copy of the CRS of the second cell from scheduled PDSCH transmission that the UE receives from the first access node.

9. The method of claim 1, wherein the first access node and first cell operate according to a first radio access technology (RAT), and wherein the second access node and second cell operate according to a second RAT different than the first RAT.

10. The method of claim 9, wherein the first RAT is 5G New Radio (5G NR), and wherein the second RAT is 4G Long Term Evolution (4G LTE).

11. A method for adaptively cancelling potential interference in a wireless communication system, the wireless communication system including a plurality of access nodes each configured to provide a respective cell, the method comprising:
    detecting, by a UE that is served in a first cell by a first access node of the plurality, multiples second cells each provided by another respective access node of the plurality that is not serving the UE;
    identifying by the UE a subset of the detected second cells based on each second cell of the detected subset meeting at least the following criteria: (i) a broadcast cell-specific reference signal (CRS) of the second cell occupies air-interface resource elements that the first access node uses as part of a physical downlink shared channel (PDSCH) of the first cell and (ii) the UE has coverage strength of the second cell that is threshold similar to coverage strength that the UE has from the first access node; and
    responsive to at least the identifying, cancelling by the UE, from scheduled PDSCH transmission from the first access node to the UE, potential interference attributable respectively to the broadcast CRS of each second cell of the identified subset.

12. The method of claim 11, further comprising limiting by the UE the subset of the detected second cells to be no more than a predefined maximum number of the second cells.

13. The method of claim 11, further comprising distributing by the UE the cancelling of potential interference among multiple CRS resource-element distributions.

14. The method of claim 11, wherein the first cell operates according to a first radio access technology (RAT), and wherein each second cell operates according to a second RAT different than the first RAT.

15. A user equipment device (UE) configured to adaptively cancel potential interference in a wireless communication system, the wireless communication system including a plurality of access nodes each configured to provide a respective cell, the UE comprising:
- a wireless communication interface supporting air interface communication according to one or more radio access technologies; and
- a controller configured to carry out operations including:
  - detecting, when the UE is served in a first cell by a first access node of the plurality, a second cell provided by a second access node of the plurality that is not serving the UE,
  - responsive to at least the detecting, determining that both (i) a broadcast cell-specific reference signal (CRS) of the detected second cell occupies air-interface resource elements that the first access node uses as part of a physical downlink shared channel (PDSCH) of the first cell and (ii) the UE has coverage strength of the second cell that is threshold similar to coverage strength that the UE has from a cell site of the first access node, and
  - responsive to at least the determining, cancelling, from scheduled PDSCH transmission from the first access node to the UE, potential interference attributable to the broadcast CRS of the detected second cell.

16. The UE of claim 15, wherein the controller is integrated with the wireless communication interface.

17. The UE of claim 15, wherein the controller comprises at least one processing unit, non-transitory data storage, and program instructions stored in the non-transitory data storage and executable by the at least one processing unit to carry out the operations.

18. The UE of claim 15, wherein determining that the broadcast CRS of the detected second cell occupies air-interface resource elements that the first access node uses as part of the PDSCH of the first cell comprises:
- determining a physical cell identity (PCI) of the detected second cell;
- mapping the determined PCI of the detected second cell to a respective resource-element distribution; and
- determining that the resource-element distribution is part of the PDSCH of the first cell.

19. The UE of claim 15, wherein determining that the UE has coverage strength of the second cell that is threshold similar to coverage strength that the UE has from a cell site of the first access node comprises:
- determining a first reference signal receive power (RSRP) of the cell site of the first access node;
- determining a second RSRP of the second cell;
- computing a difference between the first RSRP and the second RSRP; and
- determining that the computed difference is lower than a predefined threshold.

20. The UE of claim 15, wherein cancelling, from scheduled PDSCH transmission from the first access node to the UE, potential interference attributable to the broadcast CRS of the detected second cell comprises:
- generating a copy of the CRS of the second cell; and
- subtracting the generated copy of the CRS of the second cell from scheduled PDSCH transmission that the UE receives from the first access node.

* * * * *